United States Patent
Swan, III et al.

(10) Patent No.: US 7,670,478 B2
(45) Date of Patent: *Mar. 2, 2010

(54) FCC FEED INJECTION SYSTEM

(75) Inventors: George A. Swan, III, Baton Rouge, LA (US); Rustom M. Billimoria, Baton Rouge, LA (US); Rathna P. Davuluri, Fairfax, VA (US); Steven S. Lowenthal, Flanders, NJ (US); Todd R. Steffens, Centreville, VA (US); Christopher G. Smalley, Manassas, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 81 days.

This patent is subject to a terminal disclaimer.

(21) Appl. No.: 11/266,727

(22) Filed: Nov. 3, 2005

(65) Prior Publication Data

US 2006/0144758 A1    Jul. 6, 2006

Related U.S. Application Data (60) Provisional application No. 60/640,938, filed on Dec. 30, 2004.

(51) Int. Cl.
*C10G 11/18* (2006.01)
*B01J 8/18* (2006.01)

(52) U.S. Cl. ...................... 208/113; 422/140

(58) Field of Classification Search ................. 208/106, 208/113; 422/129, 139, 140
See application file for complete search history.

(56) References Cited

U.S. PATENT DOCUMENTS

| 3,654,140 | A | 4/1972 | Griffel et al. ................ 208/113 |
| 4,784,328 | A | 11/1988 | Skraba ....................... 239/432 |
| 4,832,825 | A | 5/1989 | Mauleon et al. ............. 208/157 |
| 4,948,568 | A | 8/1990 | Chessmore et al. ......... 422/140 |
| 5,037,616 | A * | 8/1991 | Williatte et al. ............. 422/140 |
| 5,173,175 | A | 12/1992 | Steffens et al. .............. 208/157 |
| 5,289,976 | A | 3/1994 | Dou et al. .................... 239/431 |
| 5,554,341 | A | 9/1996 | Wells et al. .................. 422/145 |
| 6,093,310 | A | 7/2000 | Swan ........................... 208/113 |
| 6,387,249 | B1 | 5/2002 | Cook et al. ............. 208/216 R |
| 6,503,461 | B1 | 1/2003 | Burgard et al. .............. 422/145 |
| 2003/0102251 | A1 | 6/2003 | Draemel et al. ............. 208/157 |
| 2004/0031728 | A1 | 2/2004 | Sattar ......................... 208/153 |

FOREIGN PATENT DOCUMENTS

| WO | WO0055281 | 9/2000 |
| WO | WO2006023071 A1 | 3/2006 |

* cited by examiner

*Primary Examiner*—Glenn Caldarola
*Assistant Examiner*—Randy Boyer
(74) *Attorney, Agent, or Firm*—Bruce M. Bordelon (57) ABSTRACT

This invention relates to an apparatus and process for injecting a petroleum feed. More particularly, a liquid petroleum feed is atomized with a nozzle assembly apparatus in which the apparatus has injection nozzles that produce a generally flat spray pattern of finely dispersed feed. The injection nozzles are each designed such that the overall effect of the different spray patterns from the individual nozzles provides a more uniform feed coverage across the catalyst stream.

19 Claims, 6 Drawing Sheets

FCC FEED INJECTION SYSTEM

CROSS-REFERENCE TO RELATED APPLICATION

This application claims benefit of U.S. Provisional Patent Application Ser. No. 60/640,938 filed Dec. 30, 2004.

FIELD OF THE INVENTION

This invention relates to an apparatus and process for injecting a petroleum feed. More particularly, a liquid petroleum feed is atomized with a nozzle assembly apparatus in which the apparatus has injection nozzles that produce a generally flat spray pattern of finely dispersed liquid hydrocarbon droplets that contact cracking catalyst particles. The injection nozzles are each designed such that the overall effect of the different spray patterns from the individual nozzles provides more uniform hydrocarbon feed coverage across the fluidized catalyst stream, and the nozzle positions may range from the periphery of a flowing catalyst stream to the interior of the catalyst stream.

BACKGROUND OF THE INVENTION

Atomization of petroleum feeds is important to petroleum processes such as fluidized catalytic cracking (FCC) and coking. In the FCC process, generally high molecular weight feeds are contacted with fluidized catalyst particles in the riser reactor part of the FCC unit. Contacting between feed and catalyst is controlled to promote effective heat and mass transfer to enhance conversion of the feed to the type of products desired. In catalytic cracking of the feed, reactor conditions such as catalyst to oil ratio, temperature and contact time are controlled to maximize the products desired and minimize the formation of less desirable products such as light gases and coke.

Since contacting between catalyst and feed in the FCC reactor is typically on the order of a few seconds, an important factor governing the efficiency of the cracking process is the catalyst. Catalysts for the FCC process are well known and may be either amorphous or crystalline. Catalyst entering the FCC reactor is typically fluidized using steam, fuel gas or light hydrocarbon gases generated during the cracking process or some combination thereof. The reaction of catalyst and feed generates large volumes of gaseous hydrocarbons and spent catalyst bearing coke deposits. The gas/solid mixture is passed to separators, typically cyclones, where spent catalyst is separated from vapor products. The vapor is then processed to recover desired hydrocarbons and spent catalyst is sent for regeneration.

Because of the short contacting time between feed and catalyst, the condition of the feed is also important. The type of feed injection can have an impact on the product slate produced by the FCC reactor. There are two pathways for the feed to crack into gaseous hydrocarbons, i.e., catalytic and thermal. Thermal cracking in a FCC unit is generally undesirable as this type cracking can result in the generation of light gases such as methane in addition to coke.

In order to improve the efficiency of the catalytic cracking process, it is desirable to have the feed molecules reach the active catalyst particles to the maximum extent possible and in the shortest possible time frame. Since the upward flowing catalyst exists as a fluidized solids stream substantially occupying the riser cross-section, an optimal situation would be the instantaneous dispersal of feed across the catalyst stream. However, such an instantaneous dispersal of feed across the catalyst stream is not possible. Finely dispersed droplets of feed are also desirable to increase vaporization rate when contacting liquid feed droplets with hot catalyst particles.

One method of achieving droplets of feed involves the use of steam to form a dispersion of droplets. The resulting dispersion is a two-phase system of steam and hydrocarbon that is sprayed through nozzle(s) into the FCC riser reactor where it contacts fluidized hot catalyst. The process of forcing a fluid under pressure through the orifice of a nozzle to form a fine dispersion of fluid droplets is known as atomization. The degree of atomization is a function of nozzle design, e.g., orifice size and discharge geometry, fluid properties, e.g., density, viscosity, surface tension and pressure drop across the orifice. Increasing the degree of atomization for heavy (viscous) petroleum fractions that form at least a part of the feed to the FCC process is especially challenging.

There have been numerous designs of nozzles for feed atomization in the FCC reactor. Some proposed nozzle designs utilize swirl vanes, either in the nozzle itself or the conduit leading to the nozzle. Another proposed design uses a Venturi in the conduit feeding the nozzle. Other proposed designs include feeding hydrocarbon and dispersion gas such as steam concentrically through the nozzle with mixing proximate to the orifice, a hydrocarbon feed distributor utilizing concentric nozzles located in the center of the FCC reactor, injecting feed through a plurality of orifices within the nozzle and the use of shrouds around the nozzles, and controlling the angle at which the steam and hydrocarbon contact one another. It has also been proposed to form a two-phase fluid mixture of feed and steam, dividing the fluid into two separate streams which are passed through an impingement mixing zone, a shear mixing zone to recombine the separate streams and a low pressure atomization zone. A further proposed design is a nozzle in which misting of a single feed stream may be accomplished by passing the full liquid stream, with or without included steam, through deflection vanes to create a free vortex in a single full-flow centrifugal or helical acceleration chamber which terminates in a sharp or square-edged orifice. Such orifice is substantially smaller in diameter than the fluid supply line for feeding the liquid hydrocarbons directly into the catalyst flow stream in the riser reactor. Finally, a feed injector that is generally fan-shaped has been proposed for producing a substantially flat spray pattern of atomized feed.

It is known to use radially directed feed injection nozzles to inject feed into the catalyst stream. Such nozzles are typically arranged in a circumferential band surrounding the flowing catalyst stream. The nozzles may be perpendicular to the surface of the riser or may be angled. The injection nozzles may also be integrated with injection zone mechanical design features, e.g., riser geometry, to improve their effectiveness.

While improvements to feed injector nozzle design continue, there is still a need for better performance of the complete feed injection system to facilitate contacting atomized feed with catalyst in the FCC process.

SUMMARY OF THE INVENTION

The invention is directed to an apparatus and process for contacting an atomized feed with a stream of catalyst particles in fluidized flow. One embodiment relates to an apparatus for injecting a hydrocarbon feed into a stream of catalyst particles in fluidized flow which comprises: a conduit section, said conduit section containing a stream of catalyst particles in fluidized flow; and at least one nozzle assembly within said conduit section, the nozzle assembly surrounding the periphery of said stream of catalyst particles in fluidized flow and containing at least two injection nozzles, each nozzle producing a substantially flat spray pattern such that the totality of the feed is substantially uniformly dispersed across a cross-section of catalyst particles flowing through the conduit section.

Another embodiment relates to an apparatus for injecting a hydrocarbon feed into a stream of catalyst particles in fluidized flow which comprises: a conduit section, said conduit section containing a stream of catalyst particles in fluidized flow; and at least one nozzle assembly within said conduit section, the nozzle assembly surrounding the periphery of said stream of catalyst particles in fluidized flow and containing at least two injection nozzles, each nozzle producing a substantially flat spray pattern such that the totality of the feed is substantially uniformly dispersed across a cross-section of catalyst particles flowing through the conduit section, provided that at least one nozzle extends into the stream of catalyst particles in fluidized flow.

In a preferred embodiment, the apparatus for injecting a hydrocarbon feed into a stream of catalyst particles in fluidized flow is in a riser reactor of an FCC unit, the conduit section is in said riser reactor, and the totality of the feed is substantially uniformly dispersed across a cross-section of catalyst particles flowing through the riser conduit section.

Yet another embodiment relates to a process for injecting a feed into a stream of catalyst particles in fluidized flow which comprises: conducting the feed into at least one nozzle assembly surrounding the periphery of said stream of catalyst particles in fluidized flow, injecting the feed through at least two injection nozzles located on said nozzle assembly into the stream of catalyst particles in fluidized flow, each nozzle producing a substantially flat spray pattern such that the totality of the feed is substantially uniformly dispersed across the cross-section of catalyst particles flowing past the nozzle assembly.

Yet another embodiment relates to a process for injecting a feed into a stream of catalyst particles in fluidized flow which comprises: conducting the feed into at least one nozzle assembly surrounding the periphery of said stream of catalyst particles in fluidized flow, injecting the feed through at least two injection nozzles located on said nozzle assembly into the stream of catalyst particles in fluidized flow, each nozzle producing a substantially flat spray pattern such that the totality of the feed is substantially uniformly dispersed across the cross-section of catalyst particles flowing past the nozzle assembly, provided that at least one nozzle extends into the stream of catalyst particles in fluidized flow.

In a preferred embodiment, the process for injecting a hydrocarbon feed into a stream of catalyst particles in fluidized flow is in a riser reactor of a FCC unit, the conduit section is in said riser reactor, and the totality of the feed is substantially uniformly dispersed across a cross-section of catalyst particles flowing past the riser conduit section.

DETAILED DESCRIPTION

A conventional FCC process includes a riser reactor and a regenerator wherein petroleum feed is injected into the initial reaction zone of a riser reactor containing a stream of fluidized cracking catalyst particles. The catalyst particles typically contain zeolites and may be fresh catalyst particles, catalyst particles from a catalyst regenerator or some combination thereof. Gases that may be inert gases, hydrocarbon vapors, steam or some combination thereof are normally employed as lift gases to assist in fluidizing the hot catalyst particles.

Catalyst particles that have contacted feed produce product vapors and catalyst particles containing strippable hydrocarbons as well as coke. The catalyst exits the reaction zone as spent catalyst particles which are separated from the reactor effluent in a separation zone. The separation zone for separating spent catalyst particles from reactor effluent may employ separation devices such as cyclones. Spent catalyst particles are stripped of strippable hydrocarbons using a stripping agent such as steam. The stripped catalyst particles are then sent to a regeneration zone in which any remaining hydrocarbons are combusted and coke is removed. In the regeneration zone, coked catalyst particles are contacted with an oxidizing medium, usually air, and coke is oxidized (burned) at high temperatures such as 510 to 760° C. The regenerated catalyst particles are then passed back to the riser reactor.

Suitable hydrocarbon feedstocks for the catalytic cracking process described herein include natural and synthetic hydrocarbonaceous oils boiling in the range of about 221° C. (430° F.) to about 566° C. (1050° F.), such as gas oil; heavy hydrocarbonaceous oils comprising materials boiling above 1050° F.; heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, naphtha, and mixtures thereof.

FCC catalysts may be amorphous, e.g., silica-alumina and/or crystalline, e.g., molecular sieves including zeolites or mixtures thereof. A preferred catalyst particle comprises (a) an amorphous, porous solid acid matrix, such as alumina, silica-alumina, silica-magnesia, silica-zirconia, silica-thoria, silica-beryllia, silica-titania, silica-alumina-rare earth and the like; and (b) a zeolite such as faujasite. The matrix can comprise ternary compositions, such as silica-alumina-thoria, silica-alumina-zirconia, magnesia and silica-magnesia-zirconia. The matrix may also be in the form of a cogel. Silica-alumina is particularly preferred for the matrix, and can contain about 10 to 40 wt. % alumina. As discussed, promoters can be added.

The primary cracking component may be any conventional large-pore molecular sieve having cracking activity and a pore size greater than about 7 Angstroms including zeolite X, REX, zeolite Y, Ultrastable Y zeolite (USY), Rare Earth exchanged Y (REY), Rare Earth exchanged USY (REUSY); Dealuminated Y (DeAl Y), Ultrahydrophobic Y (UHPY), and/or dealuminated silicon-enriched zeolites, e.g., LZ-210, Zeolite ZK-5, zeolite ZK-4, ZSM-20, zeolite Beta, and zeolite L. Naturally occurring zeolites such as faujasite, mordenite and the like may also be used. These materials may be subjected to conventional treatments, such as impregnation or ion exchange with rare earths to increase stability. The preferred large pore molecular sieve is a zeolite Y, more preferably an REY, USY or REUSY.

Other suitable large-pore crystalline molecular sieves include pillared silicates and/or clays; aluminophosphates, e.g., ALPO4-5; ALPO4-8, VPI-5; silicoaluminophosphates, e.g., SAPO-5, SAPO-37, SAPO-31, SAPO-40; and other metal aluminophosphates.

The cracking catalyst may also include an additive catalyst in the form of a medium pore zeolite having a Constraint Index (which is defined in U.S. Pat. No. 4,016,218) of about 1 to about 12. Suitable medium pore zeolites include ZSM-5, ZSM-11, ZSM-12, ZSM-22, ZSM-23, ZSM-35, ZSM-48, ZSM-57, SH-3 and MCM-22, either alone or in combination. Preferably, the medium pore zeolite is ZSM-5.

The zeolite containing catalyst may range in crystallite size from about 0.1 to 10 microns, preferably from about 0.3 to 3 microns. The relative concentrations of zeolite component and matrix on an anhydrous basis may vary widely, with the zeolite content ranging from about 1 to 100, preferably 10 to 99, more usually from about 10 to 80, percent by weight of the dry composite.

The amount of zeolite component in the catalyst particle will generally range from about 1 to about 60 wt. %, preferably from about 5 to about 60 wt. %, and more preferably from about 10 to about 50 wt. %, based on the total weight of the catalyst. As discussed, the catalyst is typically in the form of a catalyst particle contained in a composite. When in the form of a particle, the catalyst particle size will range from about 1 to 150 microns in diameter, with an average particle diameter of about 60-70 microns. The surface area of the matrix material after artificial deactivation in steam will be $\leqq 350$ m$^2$/g, preferably 10 to 200 m$^2$/g, more preferably from about 20 to 150 m$^2$/g. While the surface area of the catalysts will be dependent on such things as type and amount of zeolite and matrix components used, it will usually be less than about 500 m$^2$/g, preferably from about 50 to 300 m$^2$/g, more preferably from about 50 to 250 m$^2$/g, and most preferably from about 100 to 250 m$^2$/g.

FCC process conditions in the reaction zone include temperatures from about 450° C. to about 700° C., hydrocarbon partial pressures from about 10 to 40 psig (170 to 377 kPa), preferably from about 20 to 35 psig (239 to 342 kPa); and a catalyst to feed (wt/wt) ratio from about 2 to 20, where catalyst weight is total weight of the catalyst composite. The total pressure is from atmospheric to about 45 psig (411 kPa). Though not required, it is preferred that steam be concurrently introduced with the feedstock into the reaction zone, with the steam comprising up to about 50 wt. %, preferably about 1 to about 5 wt. % of the primary feed. Also, it is preferred that the vapor residence time in the reaction zone be less than about 20 seconds, preferably from about 0.1 to about 20 seconds, and more preferably from about 1 to about 5 seconds.

In order for feed to be converted to product in such short reactions times, it is important for the feed to be atomized into small droplets. The efficiency of the cracking process for converting feed to product is a function of the physical properties of the feed (viscosity, density and the like), physical properties of the catalyst stream (nature and configuration of catalyst), feed droplet size, droplet distribution into the reaction zone, spray angles between feed droplets and catalyst particles, process conditions including flow rates of gases and liquids and pressures, and injector design. Additional factors that influence injector design include pressure drops across the injector orifice, relative velocity between feed and any gas added to aid atomization and ratio of gas to liquid. Thus the efficiency of the cracking process is dependent in part on the type and design of the feed injector. The injector should atomize and disperse feed droplets as well as be durable, i.e., capable of extended periods of service without plugging or suffering undue mechanical wear, e.g., abrasion from contact with catalyst particles. In the FCC process, feed is injected into the fluidized stream of catalyst particles through at least one injector situated to allow efficient contact between feed droplets and catalyst particles.

The feed is normally pre-heated to temperatures of from 120 to 450° C. A gas or gases is preferably added to the feed to enhance the atomization process. Such gases include steam, nitrogen, hydrogen, FCC off-gas and lower molecular weight ($C_6-$) hydrocarbons. Preferably steam is employed for atomization. The ratio of steam to feed can influence the atomization process by controlling the density of the resulting feed/steam mixture. The amount of steam is generally in the range from 0.1 to 10.0 wt. %, based on the weight of the feed/steam mixture. It is known that a cross section of fluidized catalyst particles flowing in the riser section may contain areas which are non-uniform with regard to parameters such as temperature, catalyst density, and catalyst mass flux. These areas of non-uniformity make it difficult to achieve a uniform dispersion of atomized feed across the catalyst flowing in the riser. While commercial FCC units may contain a variety of nozzle designs, each individual riser reactor uses a consistent nozzle design within that unit, i.e., the nozzles used are the same. Thus these individual units have a difficult task in achieving uniform dispersion of feed within the catalyst stream.

The plurality of nozzles according to the present invention may each produce different spray patterns in the process of atomizing the feed prior to or during injection into the catalyst stream in the riser. The minimum number of nozzles is two but additional nozzles may be used as desired. The preferred number of nozzles is from 4 to 16, especially 6 to 8. The preferred spray pattern is a substantially flat fan-shaped pattern as disclosed for example in U.S. Pat. No. 5,173,175 incorporated herein in its entirety.

In the case of two nozzles, the preferred arrangement is that they be located opposite each other on the periphery of the riser catalyst stream. If additional nozzles are employed, they may be approximately evenly spaced on an annular ring surrounding the catalyst stream. The nozzles may be arranged in more than one level and two or more annular rings containing nozzles in different levels may be employed.

The factors affecting the penetration of feed into the fluidized catalyst stream within the riser reactor include those associated with the riser reactor dimensions, the catalyst particle properties, catalyst stream flow properties, the feed and spray pattern of feed contacting the catalyst stream, plus those associated with the nozzles. Factors include, but are not limited to riser diameter, overall transfer line and unit geometry, catalyst circulation rate and flowing density, catalyst physical properties, feed rate, and feed physical and chemical properties.

A. Riser Reactor and Catalyst

One factor influencing feed penetration into the catalyst stream is the diameter of the riser reactor. The problem of uniform penetration of feed across the catalyst stream becomes more complex as the diameter of the riser increases. The larger the diameter of the riser, the larger the diameter and momentum of the catalyst stream flowing therein. The riser reactor diameter then raises other factors. Not only does the feed have to penetrate a larger cross-section of catalyst, it may also encounter increasing irregularities in the catalyst stream itself, e.g., localized catalyst density across the stream, temperature differences, and localized catalyst velocity. Other catalyst properties which may be a factor include average particle size, particle size distribution, volume and surface area of catalyst particles, particle density, and heat transfer properties.

B. Feed Spray Pattern

Factors influencing the feed spray pattern include the shape of the spray pattern and the properties of the droplets making up the spray droplets. Such factors include the oil and steam mass flow rates, Sauter mean oil droplet diameter, and the oil spray velocity at the exit of the nozzle.

The spray pattern is preferably substantially flat and fan-shaped. By substantially flat is meant the aspect ratio of the spray, i.e., the thickness of the spray relative to the width of the spray, both taken as orthogonal to the direction of the flow of the spray (away from the nozzle) is generally less than 1:1. With regard to the present invention, the aspect ratio is generally significantly less than 1:1 and can be generally from about 1:2 to 1:5 or less at the injector discharge. The aspect ratio generally becomes progressively smaller as distance increases along the spray flow path. The width of the spray generally increases linearly with distance from the injector as a function of the tangent of the included angle of the spray across the width. The spray thickness dimension is orthogonal to the axial spray path and remains relatively constant with distance from the injector. The fan shape as taken from a general plan view along the axis of flow of the catalyst stream can be narrow as characterized by a triangular shape having a large height to base ratio or can be broad as characterized by a triangle having a small height to base ratio. Thus the spray pattern of feed can be varied in order to optimize penetration into the fluidized catalyst stream with contacting of atomized feed and fluidized catalyst in the riser "mix zone". The spray pattern is controlled by the nozzle design as discussed further below.

The varied spray patterns of feed are such that the feed is substantially uniformly dispersed across the cross-section of catalyst particles flowing in the riser. By substantially uniformly dispersed across the cross-section of catalyst particles is meant that mass distribution of the composite feed injection sprays in the riser cross section closely matches the mass distribution of catalyst across the same cross-section. Hence the localized catalyst to feed oil mass ratio throughout this riser cross-section remains relatively constant at all locations. Penetration of feed into the catalyst stream can be a function of the individual spray pattern of the feed injectors. By varying the individual spray patterns, a substantially uniform dispersal of feed across the catalyst stream can be achieved.

Oil and steam mass flow rates can influence the interaction of feed with catalyst. Also a factor is the method of injecting steam into the feed/feed injector. Flow rates are readily measured using conventional means. In general, steam or other suitable low molecular weight stream that is substantially a vapor at feed injector conditions (temperature and pressure) is co-injected with the hydrocarbonaceous feed in order to enhance liquid droplet formation. Preferably the mixture of vapor and atomized feed is injected into the flowing catalyst stream through an outlet from the feed injector. The weight ratio of steam to hydrocarbon feed is from about 0.0025 to about 0.2, preferably from about 0.005 to about 0.05, and more preferably from about 0.01 to about 0.03. The mass velocity of the mixture through the outlet of the feed injector is determined by the available pressure drop and the size of the orifice. Generally, the smaller the orifice, the higher the pressure drop, and the higher the discharge velocity from the orifice.

Sauter mean oil droplet diameter is also a parameter influencing the effectiveness of oil feed penetrating the hot catalyst stream. Generally, smaller oil droplets lead to increased vaporization of feed that in turns leads to more favorable cracking conditions for the feed, e.g., increased contact between feed and catalyst. However, increased vaporization rates also decrease penetration of the spray into the flowing catalyst stream, limiting the overall contact with the entirety of the flowing catalyst stream. The feed is typically subject to pre-heating to facilitate feed vaporization and hence atomization. The feed may be mixed with an inert gas, preferably steam. Shearing or agitation forces may also be applied to the feed for atomization purposes.

Rapid vaporization becomes more of a factor as the feeds become heavier, e.g., resids as feeds. It is preferred that the mean droplet size be less than about 1000 microns, preferably less than about 400 microns, and more preferably less than about 250 microns. Sauter mean droplet diameter is typically determined by optical techniques such as light scattering interferometry or Fraunhofer diffraction of a parallel beam of monochromatic light by liquid droplets, the operating principle of the Malvern particle sizer. The distribution of measured light energy can be converted to a distribution of droplet diameters in the spray from which the Sauter mean diameter is calculated.

The oil spray velocity at the nozzle exit can also influence penetration of oil feed into the hot circulating catalyst system. From a simple view of a momentum balance, increasing the velocity of the oil spray increases the momentum of the spray and results in increased penetration of the flowing catalyst stream.

B. Nozzles

The preferred fan-shaped sprays are achieved by adjusting the nozzle design. Such fan-shaped sprays can be obtained by using nozzles having rectangular or elliptical orifices. The configuration of the fan shape itself can be controlled by adjusting the nozzle orifice parameters, i.e., by adjusting the orifice cross-sectional area and aspect ratio (effective width:height ratio of the atomizing orifice). The spray pattern and discharge velocity can also be controlled by adjusting nozzle spray diffuser geometry downstream of the atomizing orifice. Parameters such as angle of resultant spray can be set by design of the fan tip to constrain radial divergence. Reference is made to U.S. Pat. Nos. 5,173,175 and 6,093,310 which are incorporated herein for injectors producing a substantially flat fan-shaped spray. The included angle coverage of oil spray for the respective nozzles is from about 30° to about 115°, preferably from about 450 to about 75°. It is preferred that the individual spray patterns are approximately overlapping at the extremity of the individual injector sprays.

A factor with regard to nozzles is the positioning of the nozzle in relation to the catalyst stream. In a preferred embodiment, the nozzle tip is at or near the outer surface of the catalyst stream, i.e., close to or in the riser wall. In this embodiment, penetration of feed into the catalyst stream is a function of nozzle design and operating factors relating to the catalyst stream and riser reactor design. In an alternative embodiment, the nozzle tip may vary in position from the outer surface (periphery) of the catalyst stream to near the center of the catalyst stream. Moving the position of the nozzle tip from the outer surface to the interior of the catalyst stream may improve penetration of the feed. The positioning of the nozzle in the alternative embodiment is also a function of the nozzle design, catalyst conditions and design of the particular riser. The individual nozzles may range from the periphery to at or near the centerline if the nozzle is extended into the catalyst stream. Thus the range is from 0 to 100% of the radial distance from the riser wall to centerline. For nozzles extending into the catalyst stream, the distance is preferably from 10 to 75%, more preferably 10 to 50% of the distance from riser wall to centerline. The penetration of the nozzle toward the centerline of the riser can be accomplished by extending the piping and appropriate erosion protection from the periphery of the catalyst flow toward the center, or may be done axially along the flow of the catalyst from the generally upstream direction with respect to the catalyst flow. The erosion protection may be in the form of appropriate cladding designed to protect that portion of the nozzle extending into the catalyst stream from the abrasive effects of the flowing catalyst stream.

The angle which the nozzles form in relation to the catalyst stream or the riser walls is also a factor. This angle is based on the centerline of feed from the nozzle relative to the centerline of the fluidized catalyst stream. The nozzles may be configured so that they are perpendicular to the axis of flow of the catalyst or perpendicular to the riser wall. The nozzles may also be angled from the axis of catalyst flow. Preferred angles are from about 0 to about 75° with respect to a planar surface orthogonal to the axis of catalyst flow, preferably about 45° to 60°. The nozzles may also be situated on shelves or protrusions arising from the riser wall itself.

The preferred arrangement of nozzles is in an assembly comprising at least one annular ring circumferentially surrounding the catalyst stream. The minimum number of nozzles is two, more preferably 4 to 16, most preferably 6 to 12, and the nozzles are spaced around the circumference. The nozzles may be in one annular ring or there may be two or more layers of annular rings each bearing nozzles. The preferred mixture of nozzles and hence spray patterns is that which will achieve the maximum contacting of the oil spray with the flowing catalyst stream. The nozzle spacing will be a function of the geometric pattern of spray produced by the individual nozzles as well as riser dimensions. For optimal contacting, a greater number of injectors is preferred and is generally limited by the circumferential dimension of the riser at the feed injection nozzle attachment elevation. The limit can generally be established by the need for enough width of the steel in the ligament formed by two adjacent feed injection nozzles to have sufficient mechanical strength, as can be determined by such methods as finite element analysis of the riser.

An important aspect of the invention is to tailor atomized oil sprays by designing and integrating individual injectors to provide a feed injection system that results in a more uniform penetration of feed into and across the catalyst in the feed/catalyst mixing zone. This is shown in the following examples.

Example 1

Figure 1:
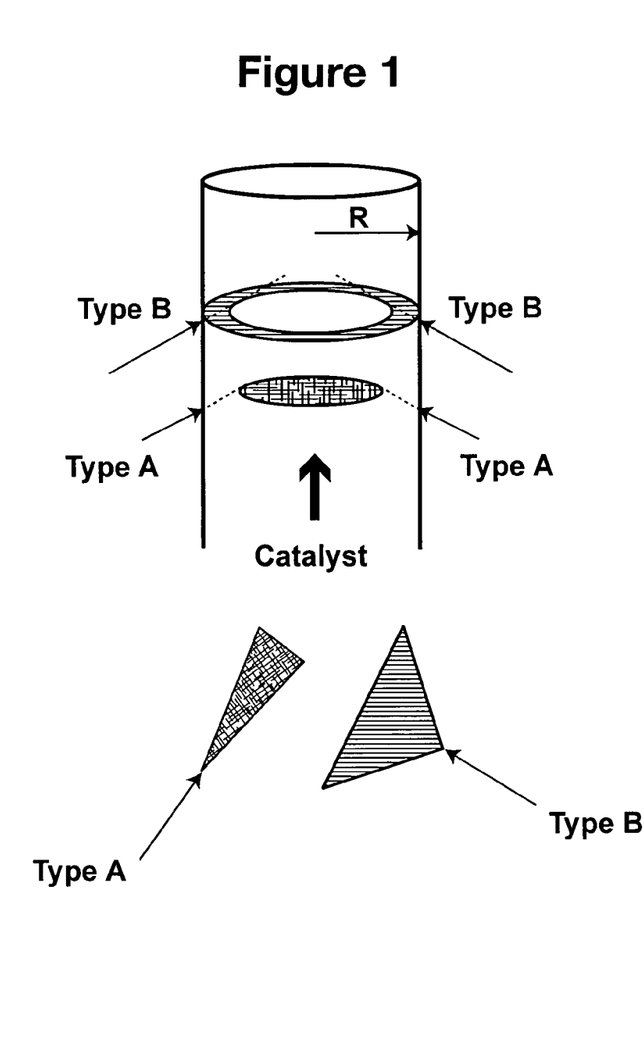
FIG. 1 is a schematic showing two different fan-shaped spray patterns and their penetration into a catalyst stream.

The shape of the spray patterns for the combination of nozzles is determined by the penetration of each individual spray pattern into the upflowing catalyst stream within the riser. This is illustrated in FIG. 1 which is a schematic diagram showing the penetration of different sprays into the catalyst stream. In FIG. 1, R is the radius of the mixing zone of a stream of catalyst particles as measured from the center of the stream (generally the center of the riser reactor) to the outer edge (generally the wall of the riser reactor). Two different types of nozzles, Type A and Type B, are positioned in a plane symmetrically about the circumference of the riser reactor. The nozzles may be positioned such that the axes of the injected sprays are either coincident with the plane orthogonal to the axis of the flowing catalyst particles or inclined at an angle less than 90° above this plane, and the inclination angles may be different for each type of nozzle.

The spray pattern from nozzle B designated as Type B may be a relatively wide-angle, fan-shaped spray made up of relatively small Sauter mean droplet diameters at lower exit velocities. As shown in FIG. 1, these nozzles are for contacting that portion of the catalyst stream in the region from 0.5 R to R. The nozzles may be positioned at an angle β above the horizontal with included spray angles greater than about 45°. Included spray angle is defined as the angle forming the apex of the approximately triangular spray at the outlet of the feed nozzle. These injectors typically could have fan extensions to reduce exit velocities and could be designed to inject at least 50 wt. % of the oil feed with relatively higher dispersion steam rates via internal steam spargers.

As shown in FIG. 1, injector nozzle Type A would provide narrower angle sprays with relatively larger Sauter mean diameter droplets and higher exit velocities. This type of spray pattern is better for contacting the region R=0 to R=0.5 R. These injectors might be oriented at an angle α above the horizontal, where typically α<β for injector Type B and the included spray angle may be <45°. Type A injectors may not have a fan extension and could be designed for injecting up to 50 wt. % of the feed with less dispersion steam than for Type B injectors, although steam would still be added by internal steam spargers.

It would be possible to arrange a variety of nozzles producing different fan-shapes around the circumference of the catalyst stream. It would be preferred to arrange such nozzles in matched pairs. In this manner, it would be feasible to inject feeds uniformly across the diameter of the catalyst flowing in the riser reactor.

Figure 2:
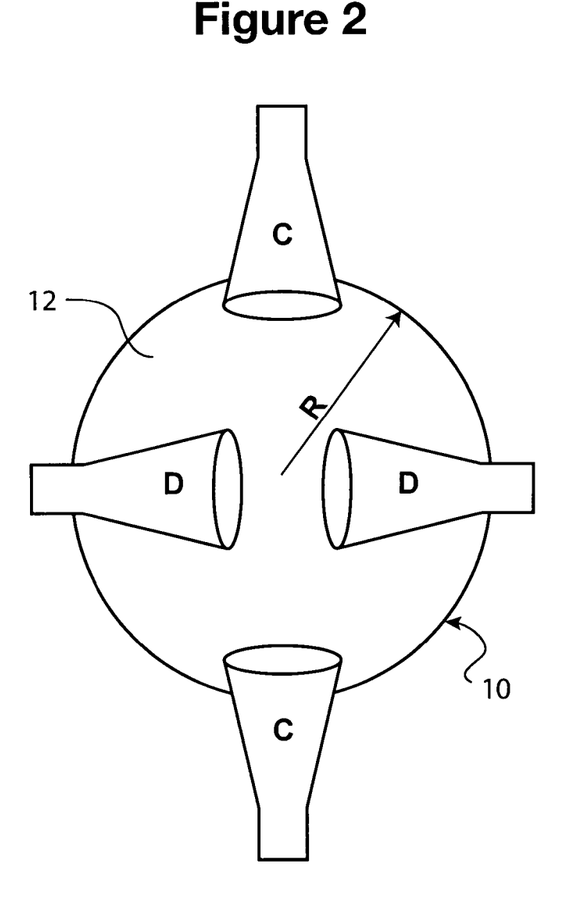
FIG. 2 is a schematic drawing showing two pairs of nozzles at different penetration depths in a catalyst stream.

In an embodiment of the present invention, nozzles are arranged at different penetration depths in the upflowing catalyst stream. This is shown in FIG. 2. FIG. 2 is a top view of a schematic drawing showing two pairs of nozzles at different penetration depths into the catalyst stream having a radius R. The nozzles C and D produce the same fan-shaped spray pattern differing only in penetration depth. Nozzle C is positioned at the periphery of the catalyst stream 12 flowing in conduit 10. Nozzle D is positioned in the catalyst stream 12 at approximately 0.5 R. In this manner, penetration of feed into and across the catalyst stream is controlled by the positioning of nozzles within the catalyst stream.

It would be feasible to vary the configuration of the spray pattern as in FIG. 1, nozzle positioning as in FIG. 2, number of nozzles, or some combination thereof to achieve uniform penetration of feed across the catalyst stream.

The measure of uniform penetration across the catalyst stream may be inferred from the downstream riser temperature drop and radial temperature profile downstream of the mix zone. Thus one measures the results of improved feed/catalyst contacting. Better contacting of feed/catalyst results in a more rapid temperature drop with the near uniform temperature profile in the riser cross-section at any given, axial position downstream of the mix zone. This then serves as a measure of the uniformity of penetration of feed across the catalyst stream.

A plant trial of such a two-tiered feed injection configuration as shown in FIG. 1 was conducted at a 172 $m^3$/hr capacity FCCU. Two types of feed nozzles were installed. Referring to the schematic in FIG. 1, four Type A nozzles uniformly spaced around the circumference of the 0.76 m diameter riser were designed to deliver a spray having an included angle of 45° with ~45 m/sec exit velocity at the fan tip and target Sauter mean diameter approximately 275 microns. Similarly four Type B nozzles located 0.4 m above the Type A nozzles were designed to provide a spray having an included angle of 60° and exit velocity 60 m/sec with target smaller Sauter mean spray droplet diameter of 225 microns. Both Type A and Type B nozzles were inclined 45° above the horizontal plane.

Two comparisons were conducted with constant feed quality and operating conditions, e.g., catalyst circulation rate, feed preheat temperature, etc. In Case 1 the total feed was injected through Type A nozzles with addition of 1.6 wt. % injection steam and purge steam added through Type B nozzles. In Case 2 the total feed with 1.6 wt. % added steam was injected through Type B nozzles and only purge steam introduced through Type A nozzles. The improvement in feed/catalyst contacting achieved in Case 2 was observed by temperature readings from thermocouples located approximately 3 m downstream of the upper injector ring. In Case 2 the average downstream temperature was 554° C., whereas in Case 1 the average temperature was 570° C. The higher temperature in Case 1 indicates less endothermic cracking reactions were occurring as feed droplets were not uniformly contacting hot, regenerated catalyst. Higher thermal cracking was observed leading to increased dry gas and coke yields. Conversely in Case 2, more effective feed/catalyst contacting resulted in lower dry gas ($C_2$—) and coke yields, and 0.8 wt. % higher 221° C.-conversion, with process performance improvement reflected in the following table:

| Yields | Delta (Case 2-Case 1) Wt. % Fresh Feed |
|---|---|
| C2-Dry Gas | −0.2 |
| LPG (C3 + C4) | −0.2 |
| Light Cat Naphtha (C5-100° C.) | 0.8 |
| Intermediate Cat Naphtha (100-145° C.) | 0.5 |
| Heavy Cat Naphtha (145-205° C.) | 0 |
| Light Cycle Oil (205-245° C.) | 0 |
| Heavy Cycle Oil (245-378° C.) | −0.5 |
| Bottoms (378° C.+) | −0.3 |
| Coke | −0.1 |

Example 2

Figure 3:
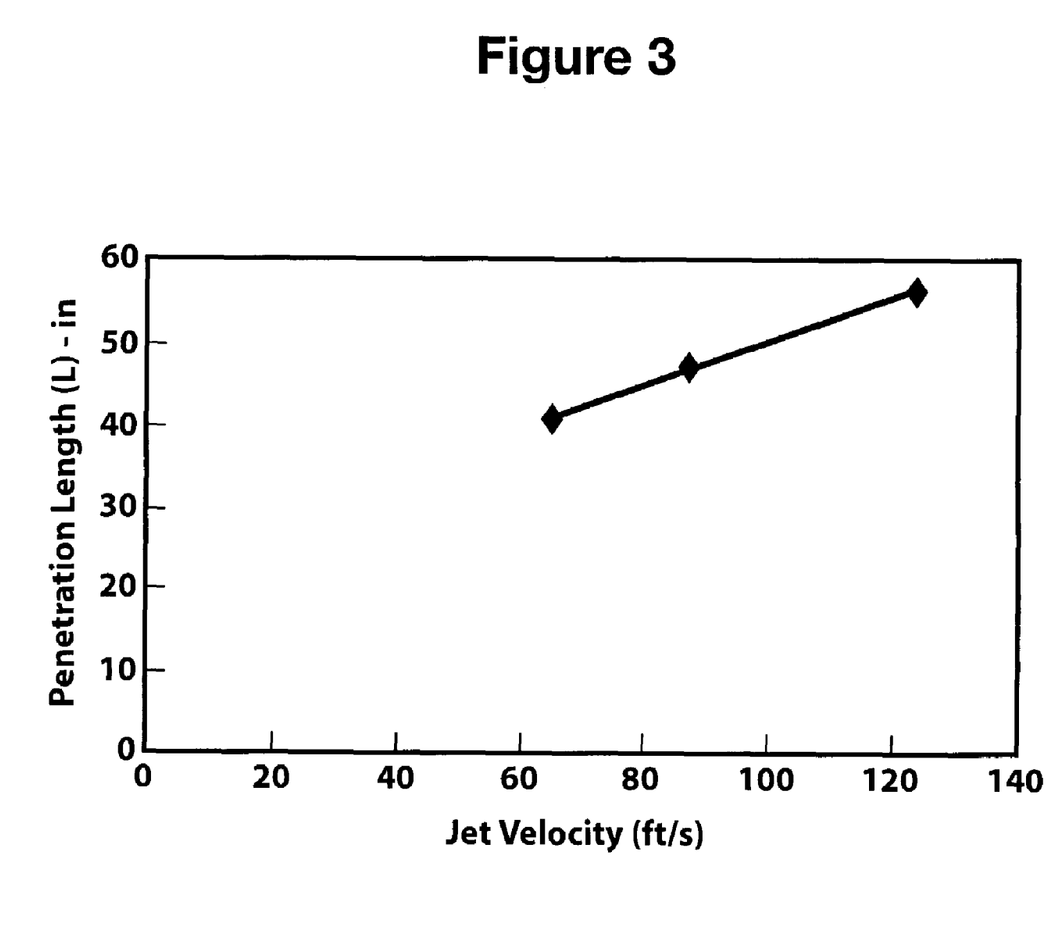
FIG. 3 is a graph showing the effect of jet velocity of feed on the jet penetration of feed into the catalyst stream.

This example demonstrates the effect of jet velocity on the jet penetration length of the feed. FIG. 3 is a graph showing jet penetration length in inches as a function of jet velocity of droplets in ft/sec. In FIG. 3, it can be seen that increasing the jet velocity increases the jet penetration length of the spray pattern into the catalyst stream, all other factors being constant.

Example 3

Figure 4:
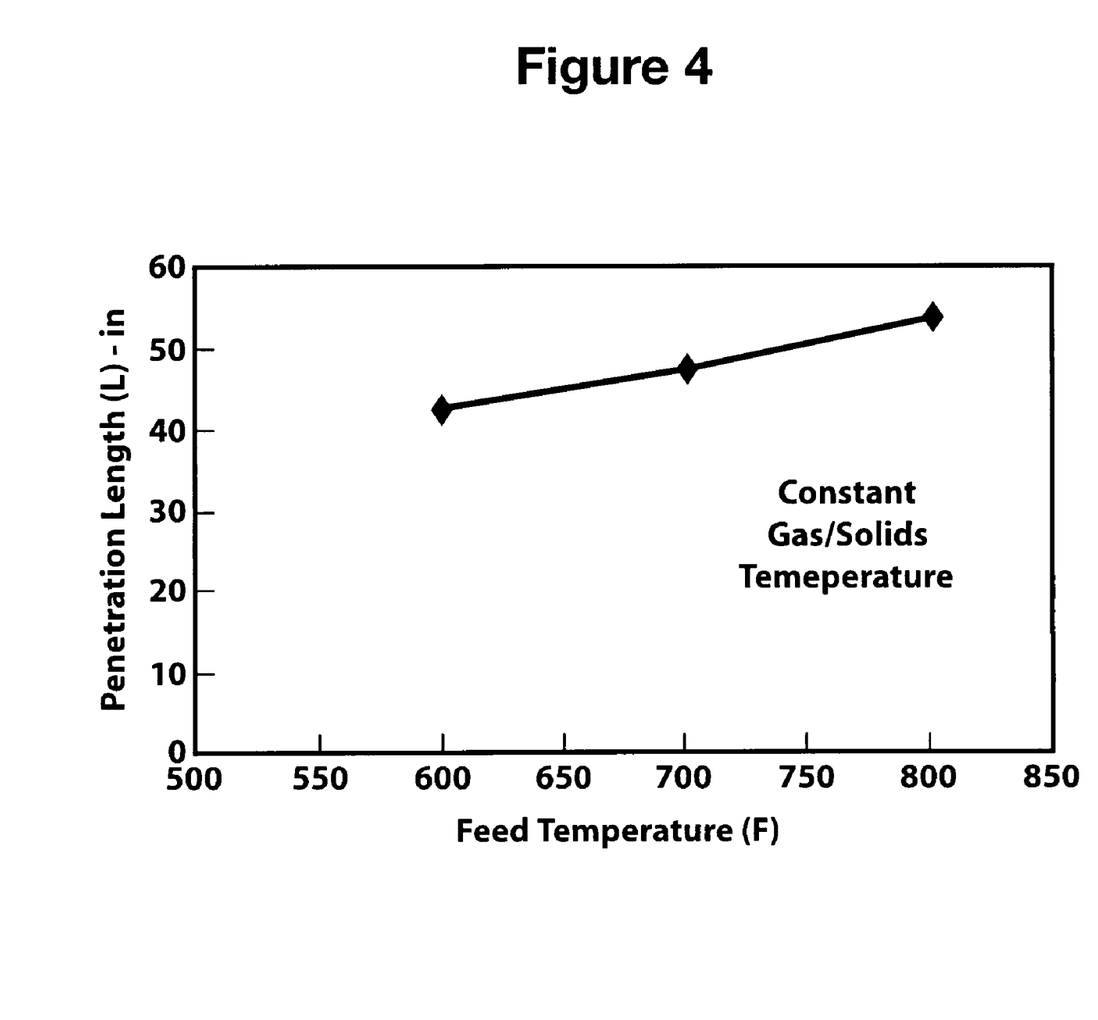
FIG. 4 is a graph showing the effect of feed temperature on jet penetration length of feed.

This example demonstrates the effect of feed temperature on the jet penetration length of the feed. FIG. 4 is a graph showing the effect of temperature of the feed on jet penetration length. As shown in FIG. 4, increasing the feed temperature at constant gas/solids temperature will decrease the temperature difference between the gas/solid and oil droplet temperature. This leads to a lower evaporation rate that in turn leads to longer penetration length.

Example 4

Figure 5:
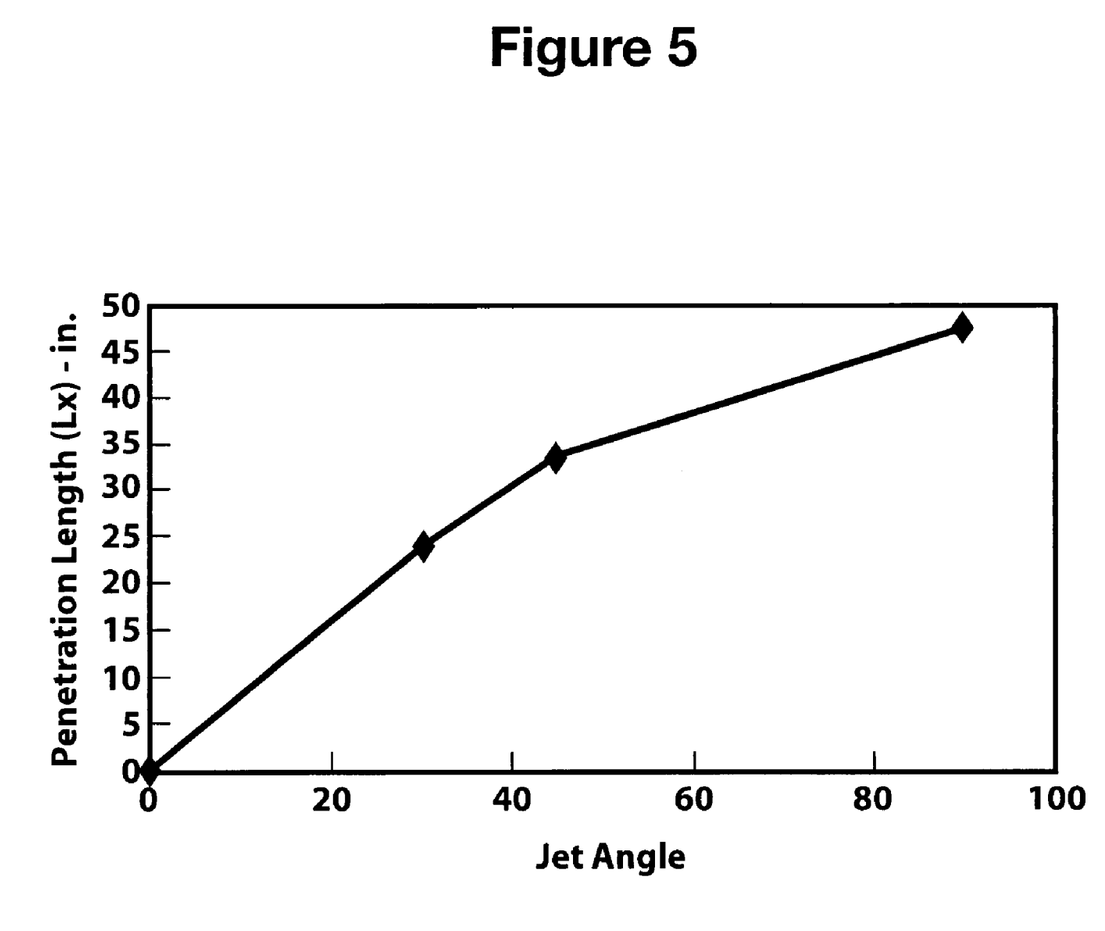
FIG. 5 is a graph showing the effect of jet angle on jet penetration length wherein jet angle=90° (nozzle inclination angle above horizontal).

This example shows that increasing the jet angle, i.e., the angle between the nozzle and the vertical axis of the flowing catalyst stream, can have a strong influence on the jet penetration length. The definition of jet angle in FIG. 5 is 90°— (inclination angle above the horizontal plane orthogonal to the axis of catalyst flow). Increasing the jet angle results in a spray which approaches orthogonal intersection with the axis of catalyst flow. Conversely, as the jet angle decreases, the nozzle spray orientation approaches parallel flow with catalyst and significantly reduces penetration of the feed droplets.

Example 5

Figure 6:
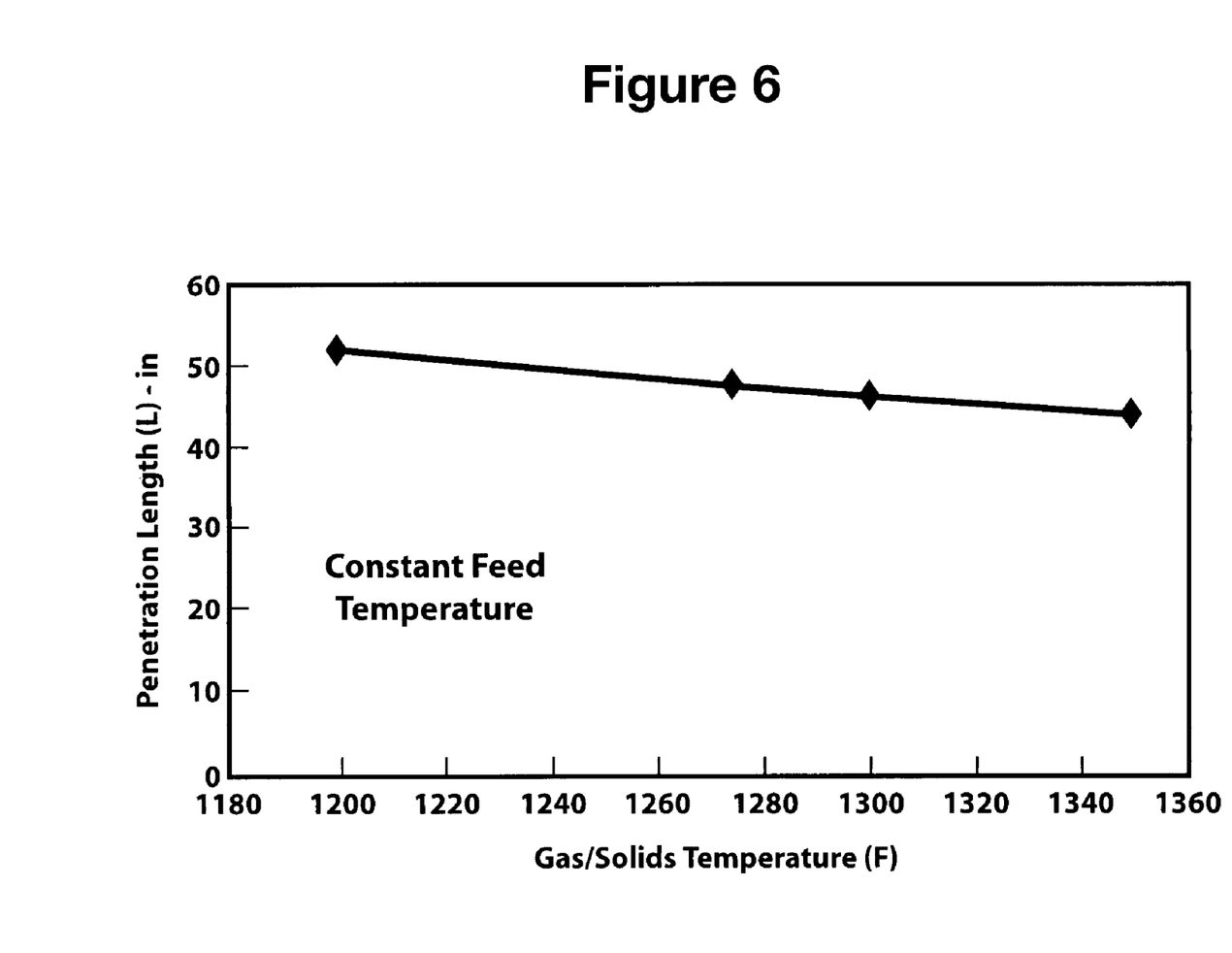
FIG. 6 is a graph showing the effect of temperature differences between the gas/solid and oil droplet on jet penetration length.

In this example, the temperature difference between the gas/solid and the oil droplet and its influence on penetration length is explored. As shown in FIG. 6, as the temperature difference between the gas/solid and oil droplet increases (at constant feed temperature), the evaporation rate increases. This increasing evaporation rate leads to decreased penetration length.

The invention claimed is:

1. An apparatus for injecting a hydrocarbon feed into a stream of catalyst particles in fluidized flow which comprises: a conduit section, said conduit section containing a stream of catalyst particles in fluidized flow; and at least one nozzle assembly within said conduit section, the nozzle assembly surrounding the periphery of said stream of catalyst particles in fluidized flow and containing at least two injection nozzles, wherein the at least two injection nozzles each produce different spray patterns, and each nozzle produces a substantially flat spray pattern that has an aspect ratio represented by thickness of the spray relative to the width of the spray taken orthogonally to the direction of flow of the spray of from 1:2 to 1:5, such that the totality of the feed is substantially uniformly dispersed across a cross-section of catalyst particles flowing through the conduit section.

2. The apparatus of claim 1 wherein the apparatus is a feed injector assembly.

3. The apparatus of claim 1 wherein the catalyst particles in fluidized flow are in a riser reactor of a fluid catalytic cracking unit.

4. The apparatus of claim 3 wherein the conduit section is in the riser reactor.

5. The apparatus of claim 1 wherein the nozzle assembly contains from 4 to 16 injection nozzles.

6. The apparatus of claim 1 wherein the nozzles have rectangular or elliptical orifices.

7. The apparatus of claim 1 wherein nozzles form an angle of 0 to 75° from the axis of catalyst with respect to a planar surface orthogonal to the axis of catalyst flow.

8. The apparatus of claim 1 wherein included angle coverage of spray for the nozzles is from 30 to 115°.

9. The apparatus of claim 1 wherein in the at least two injection nozzles, at least one nozzle extends into the stream of catalyst particles in fluidized flow.

10. The apparatus of claim 1 wherein the at least two injection nozzles are located at the periphery of the catalyst stream.

11. A process for injecting a feed into a stream of catalyst particles in fluidized flow which comprises: conducting the feed into at least one nozzle assembly surrounding the periphery of said stream of catalyst particles in fluidized flow, injecting the feed through at least two injection nozzles located on said nozzle assembly into the stream of catalyst particles in fluidized flow, wherein the at least two injection nozzles each produce different spray patterns, and each nozzle produces a substantially flat spray pattern that has an aspect ratio represented by thickness of the spray relative to the width of the spray taken orthogonally to the direction of flow of the spray of from 1:2 to 1:5, such that the totality of the feed is substantially uniformly dispersed across the cross-section of catalyst particles flowing past the nozzle assembly.

12. The process of claim 11 wherein the catalyst particles in fluidized flow are in a catalytic cracking zone of a fluid catalytic cracker.

13. The process of claim 11 wherein the nozzle assembly contains from 4 to 16 injection nozzles.

14. The process of claim 11 wherein the feed is atomized.

15. The process of claim 14 wherein the atomized feed has a mean droplet size less than 1000 microns.

16. The process of claim 11 wherein the nozzles have rectangular or elliptical orifices.

17. The process of claim 11 wherein nozzles form an angle of 0 to 75° from the axis of catalyst with respect to a planar surface orthogonal to the axis of catalyst flow.

18. The process of claim 11 wherein included angle coverage of spray for the nozzles is from 30 to 115°.

19. The process of claim 11 wherein in the at least two injection nozzles, at least one nozzle extends into the stream of catalyst particles in fluidized flow.

* * * * *